Figure 1:
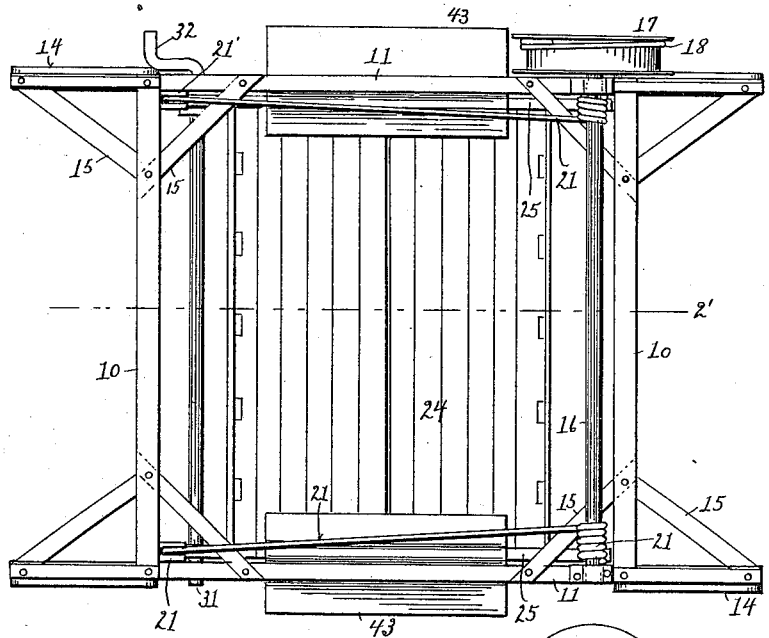

F. E. ANDERSON.
LOADING APPARATUS.
APPLICATION FILED FEB. 3, 1911.

1,009,033.

Patented Nov. 21, 1911.

2 SHEETS—SHEET 1.

Witnesses
Frank Curry

Inventor
Fred E. Anderson

F. E. ANDERSON.
LOADING APPARATUS.
APPLICATION FILED FEB. 3, 1911.

1,009,033.

Patented Nov. 21, 1911.

2 SHEETS—SHEET 2.

Witnesses
Frank Curry

Witnesses
Fred E. Anderson
By J. A. Kauss
Atty

COLUMBIA PLANOGRAPH CO., WASHINGTON, D. C.

UNITED STATES PATENT OFFICE.

FRED E. ANDERSON, OF OSAGE CITY, KANSAS.

LOADING APPARATUS.

1,009,033.   Specification of Letters Patent.   Patented Nov. 21, 1911.

Application filed February 3, 1911.   Serial No. 606,381.

*To all whom it may concern:*

Be it known that I, FRED E. ANDERSON, a citizen of the United States, residing at Osage City, in the county of Osage and State of Kansas, have invented certain new and useful Improvements in Loading Apparatus, of which the following is a specification.

My invention relates to apparatus for loading manure, dirt, etc., into vehicles, which class of apparatus usually comprises a frame under which a wagon may be driven, and a carrier, with devices for lifting the carrier from the ground and for dumping its contents into the wagon.

It is the object of my invention to improve generally upon such apparatus; to provide a simple, efficient, and durable apparatus of this class; to provide for the simple operation of the apparatus; to provide a simple, efficient, and powerful means for lifting the carrier; to provide a simple and efficient means for securing and for dumping the carrier; and to provide the parts, improvements, and combinations hereinafter set forth and claimed.

In the drawings accompanying and forming part of this specification, and in the description of the drawings, I have shown my invention in its preferred form, and have shown what I deem to be the best mode of applying the principles thereof; but it is to be understood that, within the scope of the appended claims, I contemplate changes in form, proportions, and materials, the transposition of parts, and the substitution of equivalent members, without departing from the spirit of my invention.

Figure 2:
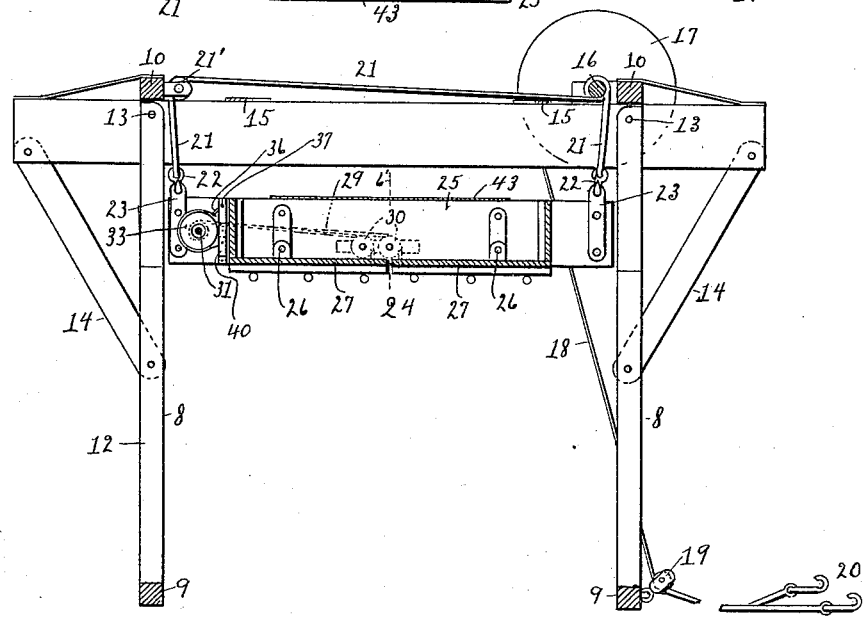
Figure 3:
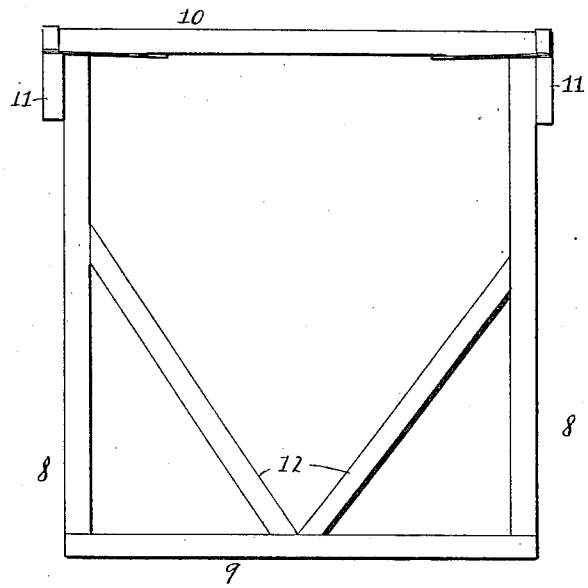
Figure 4:
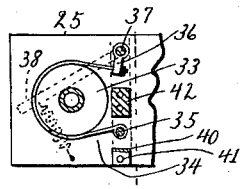
Figure 5:
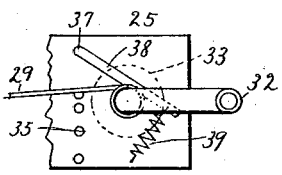
Figure 6:
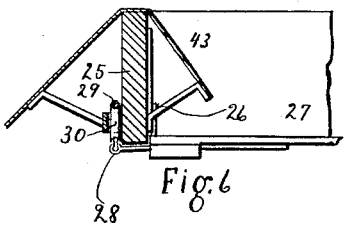
Figure 7:
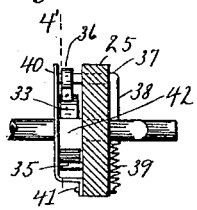

Figure 1 is a plan view of a loading apparatus made in accordance with the principles of my invention. Fig. 2 is a sectional elevation taken on a plane indicated approximately by the line 2' of Fig. 1, certain of the parts being shown in section. Fig. 3 is an end elevation of the frame. Fig. 4 is an enlarged view of the mechanism for dumping the carrier. Fig. 5 is a view of the other side of the same. Fig. 6 is an enlarged sectional view of parts of the carrier on a plane indicated by the line 6' in Fig. 2. Fig. 7 is a view of the dump mechanism taken on a plane indicated by the line 7' of Fig. 4.

Similar reference characters indicate like or corresponding parts throughout the several views.

The numerals 8 indicate the four corner posts of the frame, each two of which are connected at the bottom by a beam 9 and at the top by a beam 10.

11, 11 are two beams which connect the end frames at the top.

12, 12 are braces placed in each end frame, and each end frame is pivoted to the beams 11 at 13.

14 are braces which are bolted to the beams 11 and the posts, to hold the entire frame in rigid upright position, and 15, 15 are a number of iron or steel straps which serve to brace the frame at the upper corners.

16 is a shaft mounted on the frame, preferably in bearings on the beams 11, and 17 is a power drum mounted on the shaft.

18 is a suitable cable wrapped around the drum and passing down under a pulley 19 secured to the adjacent corner post, said cable being provided with one or two hooks 20 at its end. The purpose of these hooks is: the one being for attaching the draft horses thereto, and the other being for the purpose of securing the cable when the load is suspended as will hereinafter be explained, as by securing it to a stake in the ground to hold the load suspended after the horses are detached from the cable.

21, 21 are four cables wrapped around the shaft in the direction opposite to that in which the cable 18 is wrapped around the drum, so that as the cable 18 is unwound from the drum the cables 21 will be wound up on the shaft, and vice versa. Each of the cables 21 is provided with a hook 22 at its end, which is adapted to engage with a ring 23, there being one such ring at each of the four corners of the carrier 24. Two of the corners are under the shaft 16, so that two of the cables 21 pass directly down from the shaft thereto, while the other two cables pass over the pulleys 21' which are secured to the cross-beams 10 and located above the other two corners respectively.

The main part of the carrier comprises the ends 25, 25, between which extend the bottom and sides, which are made in two parts 27, 27, each part comprising one side and one-half the bottom, and each part is pivoted to the ends at 26, as shown, so that when released a load thereon would be dumped downwardly between the two parts. At each inner corner of each part is a rod 28, to which is attached one end of a cable 29. These cables pass upwardly over the pulleys 30, respectively, and thence to one side where they are wound around the opposite ends of the shaft 31, which is mounted in the ends of the carrier outside the parts 27, and which is provided with a crank 32 by which the cables may be wound thereon to lift and close the parts 27. On the shaft 31, preferably just inside one of the ends 25, is mounted a friction wheel 33, encircling which is a friction brake band 34, one end of which is secured to a pin 35, and the other end of which is secured to an arm 36 which is secured to a rod 37 which extends through the end 25 and is turned down, as shown at 38 on the opposite side of the end 25. Secured to the arm 38 is a spring 39 whose tension is in such direction as to tighten the band 34 on the wheel 33 and is strong enough to keep the parts 27 in closed position even with a load in the carrier.

40 is a strap iron forming an outer bearing for the pin 35 and the rod 37, and being secured to the end 25 by an offset 41 at its lower end, and also being properly spaced apart therefrom by the block 42.

43 are protecting shields placed over each end of the carrier, and also serve to guide a scraper over the ends; it being contemplated that when the carrier is let down on the ground, it may be loaded by such means as scrapers, as well as by any other suitable means.

To lift the carrier, the draft animals are attached to one of the hooks 20 to pull the cable 18 off the drum 17, thereby winding the cables 21 on the shaft 16 and lifting the carrier. When the carrier is properly lifted, the cable may be held by the other hook being attached to a stake in the ground, and the draft animals may be used for hauling the wagon under the carrier. Then by pushing up on the rod 38 and releasing the grip of the band 34 from the wheel 33, the carrier will dump its contents into the wagon, and may be closed by turning the crank 32, to which action the band 34 will yield. The loaded wagon may be driven away, and the carrier lowered to the ground. Of course, the apparatus may be used in any other way, or any other sequence of operations may be adopted. But I claim that my apparatus affords ease, simplicity, power, and quickness in operation not to be found in any other apparatus of similar nature.

What I claim is:—

1. The combination of a frame comprising four corner posts, a beam connecting each two corner posts at the bottom and diagonal braces extending from said beam to the corner posts, end beams to which the corner posts are pivoted at their upper ends, crossbeams connecting the end beams above the corner posts, braces connecting the crossbeams with the end beams, and braces connecting the end-beams with the corner posts; a shaft mounted in the upper part of the frame, a drum secured on said shaft, a pulley secured to the lower part of the frame under the drum, a cable wound upon the drum and passing thence through said pulley, two hooks secured to said cable at its free end; four cables wound around the shaft in a direction opposite to the winding of the first-named cable on the drum, a hook on the end of each of said four cables, pulleys secured to the upper part of the frame for carrying two of said four cables; a carrier comprising two ends to which said four cables are secured, and a bottom and two sides, the bottom and sides being made in two parts, each part consisting of one side and one-half of the bottom, and each part being pivoted to said ends; a shaft with a crank mounted in said ends, cables wound upon said shaft and secured to said bottom parts for lifting and closing them; and a friction clutch arranged upon the shaft and capable of holding said bottom closed with a load thereon.

2. In an apparatus of the kind described, the combination with a carrier having ends and sides and a drop bottom, a cable for lifting and closing the bottom, a shaft mounted in the ends for operating the cable, a wheel mounted on the shaft adjacent to one end, a band encircling said wheel and secured to the carrier end at one of the band ends, a rod extending through the carrier end, an arm secured to said rod adjacent the wheel, and one of the band ends being secured to said arm, and the rod being turned at substantially right angles on the side opposite the wheel, and a spring secured to said rod tending normally to tighten the band against the wheel and capable of thereby holding the bottom closed with a load in the carrier.

In testimony whereof I have affixed my signature in presence of two witnesses.

FRED E. ANDERSON.

Witnesses:
FRANK CURRY,
C. J. ROSEN.